United States Patent [19]

Tatsuno et al.

[11] Patent Number: 5,377,212
[45] Date of Patent: Dec. 27, 1994

[54] SOLID-STATE LASER DEVICE INCLUDING UNIAXIAL LASER CRYSTAL EMITTING LINEARLY POLARIZED FUNDAMENTAL WAVE AND NONLINEAR OPTICAL CRYSTAL EMITTING LINEARLY POLARIZED HARMONIC WAVE

[75] Inventors: Kimio Tatsuno, Kodaira; Tetsuo Andou; Tsuyoshi Miyai, both of Kokubunji; Sten Helmfrid, Musashino; Masahiko Takahashi, Kodaira; Koji Muraoka, Tokyo; Shigeru Nakamura, Tachikawa, all of Japan

[73] Assignees: Hitachi, Ltd.; Hitachi Metals, Ltd., Tokyo, Japan

[21] Appl. No.: 961,648

[22] Filed: Oct. 16, 1992

[30] Foreign Application Priority Data

Oct. 17, 1991 [JP] Japan ................ 3-269249
Feb. 28, 1992 [JP] Japan ................ 4-042828
Feb. 28, 1992 [JP] Japan ................ 4-042832

[51] Int. Cl.$^5$ ............................................ H01S 3/109
[52] U.S. Cl. ............................... 372/22; 359/328
[58] Field of Search ................ 372/21, 22; 385/122; 359/326–332

[56] References Cited

U.S. PATENT DOCUMENTS

| 3,611,231 | 10/1971 | Burke | 372/22 X |
|---|---|---|---|
| 4,617,666 | 10/1986 | Liu | 372/22 |
| 4,618,957 | 10/1986 | Liu | 372/22 |
| 4,637,026 | 1/1987 | Liu | 372/22 |
| 4,884,277 | 11/1989 | Anthon et al. | 372/22 |
| 4,910,740 | 3/1990 | Oka | 372/22 |
| 4,933,947 | 6/1990 | Anthon et al. | 372/21 X |
| 5,030,851 | 7/1991 | Unternahrer | 372/22 X |
| 5,095,491 | 3/1992 | Kozlovsky et al. | 372/21 X |
| 5,197,073 | 3/1993 | Oka | 372/22 |
| 5,263,038 | 11/1993 | Lukas et al. | 372/22 |

Primary Examiner—John D. Lee
Attorney, Agent, or Firm—Antonelli, Terry, Stout & Kraus

[57] ABSTRACT

A short-wavelength laser having a stable output and an optical information processing system capable of high-density recording are disclosed. A solid-state laser is used as a light source, and a nonlinear optical crystal is arranged in a resonator in order to produce a short wavelength by means of a solid-state laser. The retardation of the nonlinear optical crystal is controlled by determining the length of the nonlinear optical crystal. A solid-state laser device having a stable output with the noise removed from a pumping power light source is also provided. Further, the solid-state laser device is used as a light source for the optical information processing system, and the light of irrelevant wavelengths contained in the light from the solid-state laser device are removed by a device having the ability to select wavelengths. Thus, not only a stable light source with a short wavelength but also an optical information processing system capable of high-density recording are realized.

40 Claims, 13 Drawing Sheets

F I G. 10
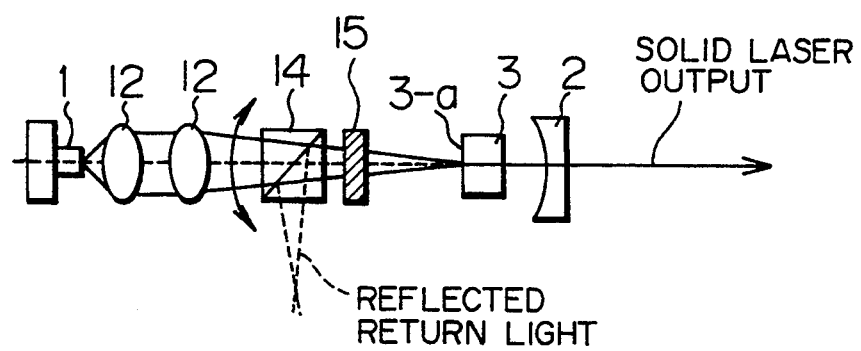

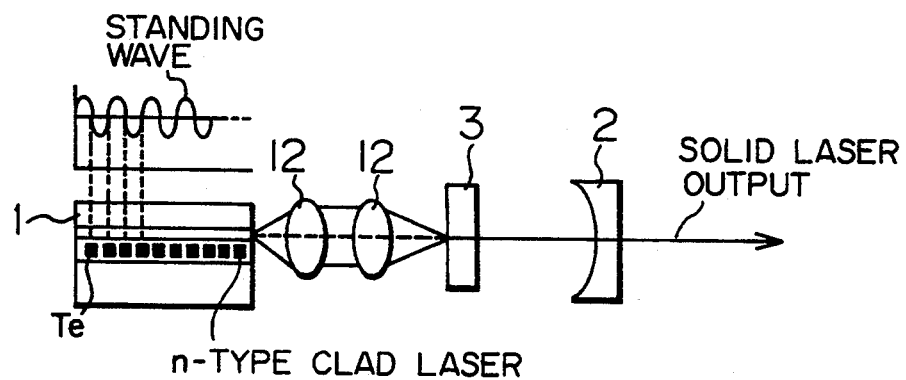
F I G. 12
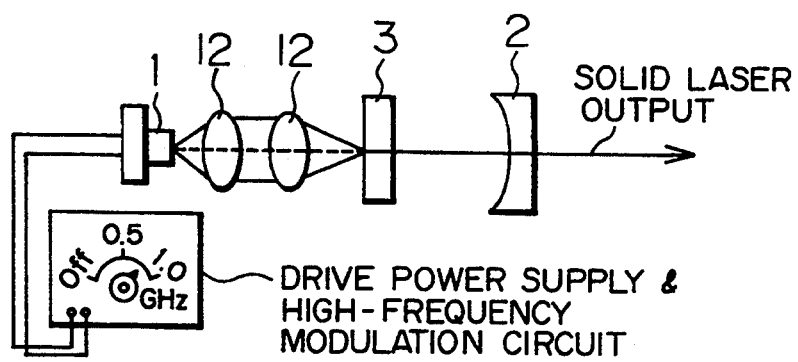
F I G. 13

REFLECTION FACTOR R = 6%
(810nm)

SOLID-STATE LASER DEVICE INCLUDING UNIAXIAL LASER CRYSTAL EMITTING LINEARLY POLARIZED FUNDAMENTAL WAVE AND NONLINEAR OPTICAL CRYSTAL EMITTING LINEARLY POLARIZED HARMONIC WAVE

BACKGROUND OF THE INVENTION

1. Field of the Invention

The present invention relates to a small solid-state laser device capable of producing a stable short wavelength output, or more in particular to an optical information processing system such as an optical disk apparatus or laser beam printer utilizing the solid-state laser device as a light source.

2. Description of the Prior Art

A study is under way to shorten the wavelength of a light source of an optical information processing system for achieving high-density recording on a recording medium. When a solid-state laser using a solid material for a laser crystal is compared with a semiconductor laser in regard to the reflection noise, for example, the output of the solid-state laser device is more stable than that of the semiconductor laser in view of the facts that (1) the semiconductor laser has a lower reflection factor of a resonator mirror and is more liable to be coupled with an external optical system, that (2) the resonator of the semiconductor laser is generally shorter in length than that of the solid-state laser, and therefore the oscillation mode is more likely to be single, thereby leading to a higher coherence, and that (3) the laser gain distribution and refractive index of the semiconductor laser are subject to greater fluctuations due to the temperature and other conditions, with the oscillation wavelength being unstable.

JP-A-3-49278 (U.S. Pat. No. 4,933,947) discloses system comprising a resonator of a solid-state laser for irradiating pumping power on a solid laser crystal and a nonlinear optical crystal arranged in the resonator for generating second and higher harmonic waves of the solid laser crystal. As a laser crystal used for such a solid-state laser device, Nd:YVO$_4$ (neodymium yttrium vanadate) in place of Nd:YAG (neodymium YAG) has recently been closely watched. This crystal is described in IEEE Journal of Quantum Electronics, Vol. 26, No. 9 pp. 1451-1459 (Sept. 1990). Nd:YVO$_4$, as compared with Nd:YAG, has the feature that the threshold value of laser oscillation is low and the absorption length short, and therefore is liable to oscillate in a single mode. As a result, on the assumption that the laser beam generated from Nd:YVO$_4$ as a solid laser crystal is used as a fundamental wave with a second high harmonic or a sum frequency generated through a nonlinear optical crystal such as KTP (KTiOPO$_4$) (potassium titanate phosphate) placed in the resonator or KN (KNbO$_3$) (potassium niobate), then a wavelength conversion efficiency higher than with a solid-state laser using only a laser crystal material (such as Nd:YAG) is obtained.

SUMMARY OF THE INVENTION

Insertion of a nonlinear optical crystal in a resonator in order to obtain an output light of short wavelength, however, causes a noise attributable to the nonlinear optical crystal in addition to the one due to the resonator length.

If a second high harmonic or a sum frequency is to be obtained with high efficiency, the wavelength from a solid-state laser device is normally converted to a second high harmonic under a phase matching condition called type II. Such a phase matching condition is described in detail in the text entitled "Fundamentals, Materials and Applications of Nonlinear Optics", for the 14th Winter Lecture Meeting held Jan. 25, 26 and 27, 1988, under the sponsorship of The Social Gathering for Optics of the Japan Society of Applied Physics. Under this phase matching condition, the fundamental wave is applied polarized in the direction of an arrangement containing the anisotropic axis of the KTP crystal. Even when the incident fundamental wave is linearly polarized, therefore, the retardation in the KTP crystal leads to an elliptic polarization while passing through the crystal. This process is repeated in a resonator so that the linear polarization of the fundamental wave of the solid-state laser is disturbed. As a result, the single mode that has thus far existed in the solid-state laser resonator changes to a plurality of modes due to the insertion of a birefringent crystal (such as a KTP crystal). This is attributable to the retardation by the birefringent crystal. In the case where a plurality of oscillation modes are in the resonator with almost the same oscillation threshold for each mode, the modes compete with each other, thereby causing a fluctuation of output light. In the sum frequency, the wavelength conversion efficiency is considerably reduced in view of the fact that only the component of linear polarization contributes to the generation of the sum frequency if the fundamental wave in the resonator is not linearly polarized.

In the case where a semiconductor laser is used as a pumping power light source of the fundamental wave, on the other hand, the problem is that the output of the solid-state laser becomes unstable due to the noise of the semiconductor laser itself.

Generally, if the laser crystal is to be efficiently excited in an end-excited solid-state laser device using a semiconductor laser, it is necessary that the focus of the pumping power coincides with the laser crystal. In addition, the excitation efficiency is further improved by rendering the beam profile of the pumping power to coincide with the mode volume of solid-state laser oscillation in a laser crystal. When high efficiency is considered, it is most likely that the depth of focus of the pumping power is large and the incident end of laser crystal is included in the depth of the focus. Under such a condition, the outgoing end of the semiconductor laser and the incident end of the laser crystal are in the relationship of conjugate images, and therefore the light reflected on the incident end of the laser crystal returns to the semiconductor laser without fail. There may also exist, though low in probability, light reflected and returning to the semiconductor laser from the optical system in subsequent stages.

In the conventional solid-state laser devices, no study has been made of the effect that the pumping power reflected from a component part (such as an end of the laser crystal) of a solid-state laser and returning to a semiconductor laser will have on the output of the solid-state laser.

Neither has been any configuration studied for irradiating stable light on a recording medium when a solid-state laser outputting a higher harmonic wave is used with an optical information processing system.

An object of the present invention is to provide a solid-state laser device which solves the above-mentioned problems and produces a stable, high-efficiency output light.

Another object of the present invention is to provide a solid-state laser comprising means for controlling the reflection noise to the semiconductor laser used as a pumping power light source of a solid-state laser to below a tolerable noise level.

Still another object of the present invention is to provide an optical information processing system not affected by the noise left unremoved by a solid-state laser.

In order to achieve the above-mentioned objects, according to an aspect of the present invention, there is provided a solid-state laser comprising a resonator including a laser medium and a reflection mirror, a pumping power light source arranged outside of the resonator, and a nonlinear crystal supplied with an input light in the form of the fundamental wave generated by the laser medium and arranged in the resonator, the nonlinear crystal acting as a full-wave or half-wave plate against the retardation at the time of application of the fundamental wave thereto.

According to another aspect of the present invention, there is provided a solid-state laser comprising a resonator including a laser medium and a reflection mirror, a semiconductor laser arranged outside of the resonator, and means for stabilizing the output light of the semiconductor laser.

According to a further aspect of the present invention, there is provided an optical information processing system comprising a solid-state laser for generating a higher harmonic wave, and an optical element disposed in the light path outgoing from the solid-state laser for selectively reflecting or passing the light of a predetermined wavelength.

The aforementioned configurations provide a solid-state laser for generating a stable higher harmonic wave with a nonlinear crystal. Further, an optical information processing system with a short-wavelength light source capable of high-density recording is provided.

BRIEF DESCRIPTION OF THE DRAWINGS

FIG. 10 is a diagram showing still another configuration of a solid-state laser considering the reflection noise of a semiconductor laser.

FIG. 12 is a diagram showing a further configuration of a solid-state laser considering the reflection noise of a semiconductor laser.

FIG. 13 is a diagram showing a still further configuration of a solid-state laser considering the reflection noise of a semiconductor laser.

DESCRIPTION OF THE PREFERRED EMBODIMENTS

The shape of a nonlinear crystal will be studied in order to produce a stable higher harmoic wave by inserting the nonlinear crystal in the resonator of a solid-state laser. A KTP crystal is used as a nonlinear crystal. If the retardation of the KTP is set to function as a full-wave or half-wave plate involving an integral multiple of the half wavelength of a fundamental wave, the linear polarization is maintained to the extent that the fundamental wave is linearly polarized before passing through the KTP. Light reciprocates many times in the resonator without changing the polarized condition. More specifically, the polarization mode in the resonator is single without causing any mode competition, thus always producing a stable output.

Generally, the retardation of an optical crystal is caused by the birefringence of the crystal. The retardation $\delta$ is given as $$\delta = 2\pi d(n_e - n_0)/\lambda \tag{1}$$

where d is the crystal length, $n_e$ the ordinary refractive index and $n_0$ the extraordinary refractive index. The ordinary refractive index $n_e$ and the extraordinary refractive index $n_0$ of a crystal are values specifically determined by the material. In view of this, a method for controlling the retardation of a KTP crystal to an integral multiple of half wavelength is by determining the crystal length d by polishing. Another method consists in dividing a KTP crystal into halves and bonding by rotating the orientation of each crystal half, thus obtaining the desired retardation for an improved accuracy. Still another method is by utilizing the fact that the birefringence of a crystal changes with temperature and controlling the retardation by determining the crystal temperature with a temperature control element such as a peltier cooler against a given crystal length. The birefringence of a crystal is also variable with an applied voltage. It is therefore possible to determine the retardation by exerting an electric field on a crystal through an electrode formed in the crystal. Any of the methods mentioned above may be combined for practical applications.

Figure 1:
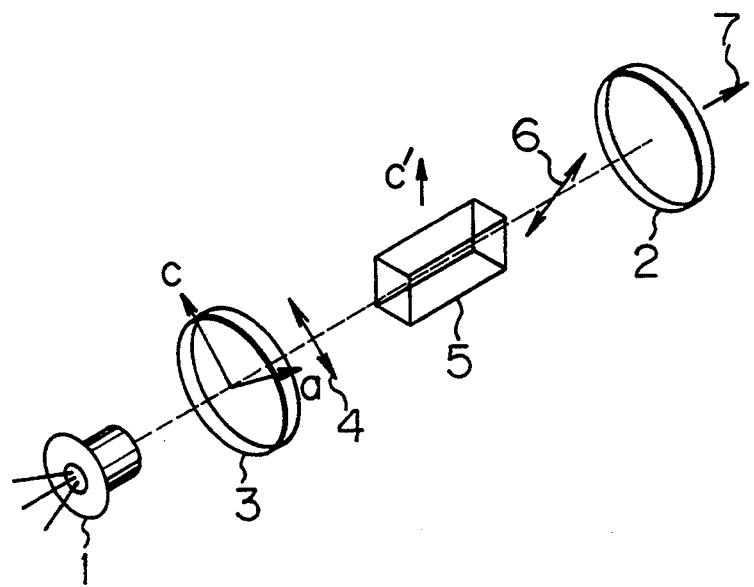
FIG. 1 is a diagram showing a configuration of a solid-state laser with a specified crystal length of a nonlinear crystal.

An embodiment of the present invention is shown in FIG. 1. Specifically, a semiconductor laser 1 is used as a pumping power light source, and a laser crystal 3 such as of Nd:YVO$_4$ makes up a resonator oscillating between an output mirror 2 and the end of the Nd:YVO$_4$ on semiconductor laser side. Under this condition, the Nd:YVO$_4$ is optically uniaxial, and therefore the fundamental wave laser light in oscillation forms a linear polarization 4 with a wavelength of 1064 nm or 914 nm in parallel to the c axis of the Nd:YVO$_4$ crystal. If a KTP 5 or the like is inserted in this resonator as a nonlinear crystal for generating a high harmonic wave, the polarized state of the fundamental wave is not generally linearly polarized due to the retardation of the KTP. To obviate this inconvenience, according to the present invention, the KPT is operated as a wavelength plate having a wavelength as large as an integral multiple of a half wavelength by assuming a crystal length of the KTP according to Equation (1). In the case where a half wavelength plate is configured, for example, the direction of polarization of the light passed through the half wavelength plate is linear as shown by the linear polarization 6 rotated by an appropriate angle from the direction of polarization of the incident light. If the retardation of the KTP or KN is constructed as a full-wavelength plate, on the other hand, the polarization of light that has passed through the full-wavelength plate is linear like the original direction of polarization. These facts remain unchanged no matter how many times the fundamental wave reciprocates in a nonlinear crystal. As a result, a second high harmonic wave (532 nm or 457 nm in wavelength) 7 of the fundamental wave having a wavelength of 1064 nm or 914 nm is stably produced without competition with other polization modes behind the mirror 2.

Also, in a similar system for generating a laser beam with a wavelength of 459 nm by a KTP crystal as a sum frequency of a semiconductor laser about 809 nm in wavelength and an Nd:YVO solid laser 1064 nm in wavelength, the contribution to a sum frequency is maximized when both the semiconductor laser and the Nd:YVO solid laser are linearly polarized. If a KTP crystal is placed in a resonator of the Nd:YVO solid laser, however, the retardation would disturb the linear polarization of the Nd:YVO solid laser into an elliptic polarization, with the result that all the light would not contribute to generation of a sum frequency thereby to reduce the wavelength conversion efficiency. When the retardation control according to the present invention is applied to a nonlinear crystal, the linear polarization of an Nd:YVO solid laser is not disturbed and the entire light contributes to generation of a sum frequency, thereby preventing the wavelength conversion efficiency from being deteriorated.

Figure 2:
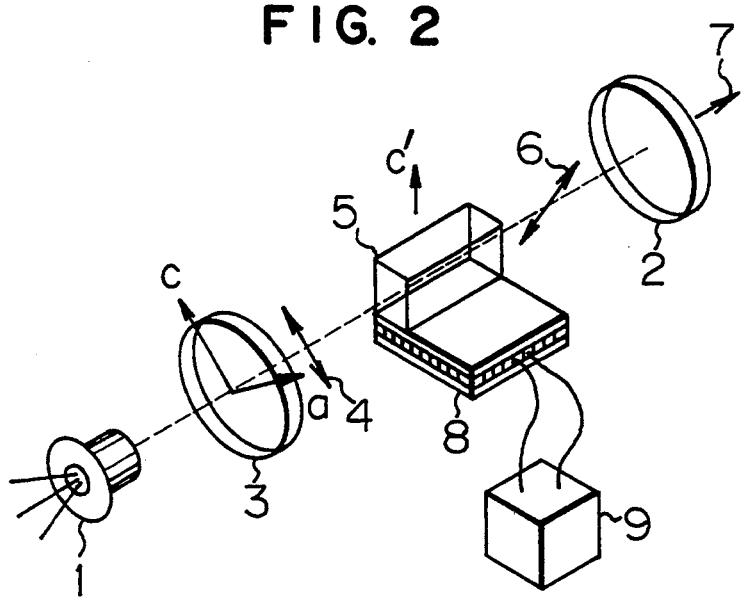
FIG. 2 is a diagram showing a configuration of a solid-state laser with a nonlinear crystal controlled in temperature.

Another embodiment of the present invention is shown in FIG. 2. This embodiment is so constructed that a temperature control element 8 is mounted on a nonlinear crystal 5. The retardation of a nonlinear crystal changes with the temperature dependence of the refractive index. It is therefore possible to operate the nonlinear crystal 5 as a half-wavelength or a full-wavelength plate by changing the temperature of the nonlinear crystal 5 through the temperature control element 8 and the control means 9 against a given crystal length. Subsequent operations are similar to those in the above-mentioned embodiment.

Figure 3:
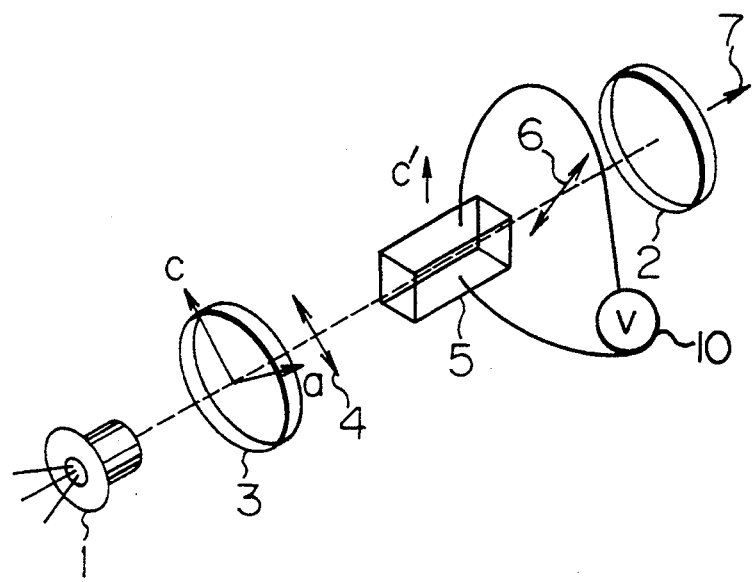
FIG. 3 shows a configuration of a solid-state laser with a nonlinear crystal controlled in voltage.

Still another embodiment of the present invention is shown in FIG. 3. This embodiment comprises means 10 for applying a voltage to the nonlinear crystal 5. The retardation of a nonlinear crystal changes with the voltage dependence of the refractive index, i.e., the electro-optic effect. It is therefore possible for the nonlinear crystal 5 to operate as a half-wavelength or a full-wavelength plate by changing the applied voltage against a given crystal length. Subsequent operations are similar to those in the first embodiment.

Figure 4:
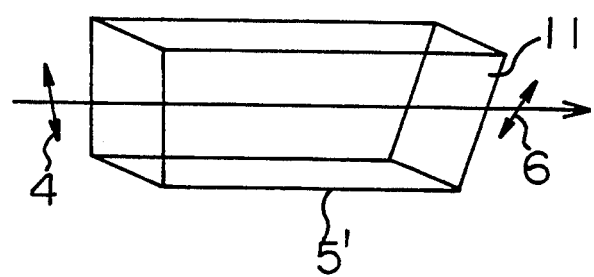
FIG. 4 is a perspective view of a nonlinear crystal used with a solid-state laser.

A further embodiment of the present invention is shown in FIG. 4. A slant 11 is formed at the incident and/or outgoing end of the nonlinear crystal 5'. This slant makes it possible to change the crystal length d in equation (1) depending on the point of passage of the fundamental wave, so that the retardation $\delta$ can be changed by changing the point of light incidence. As a consequence, it is possible to operate the nonlinear crystal 5 as a half-wavelength or a full-wavelength plate. Subsequent operations are similar to those in the above-mentioned embodiments.

Figure 5:
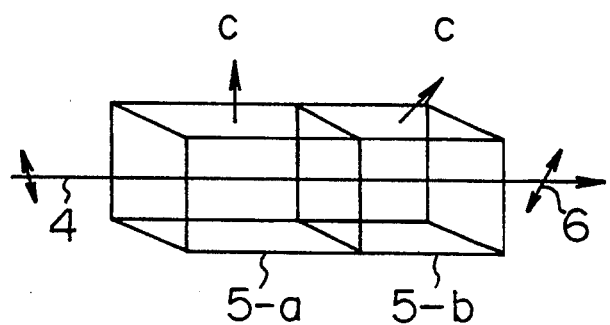
FIG. 5 is a perspective view of another nonlinear crystal used with a solid-state laser.

A still further embodiment of the present invention is shown in FIG. 5. A nonlinear crystal 5 is divided into two portions 5-$a$ and 5-$b$ having different thicknesses. The retardation is finely adjusted by rotating the optical axis of the crystal relatively at the time of coupling. As a result, the nonlinear crystal 5 can be operated as a half-wavelength or a full-wavelength plate. Subsequent operations are similar to those in the above-mentioned embodiments.

In applying a solid laser device as a light source for an optical recording system, an excitation method of large scale has so far been necessary with a high output such as lamp excitation. Such a solid laser has the problem that generation of a spatial hole burning in the laser crystal gives rise to multiple longitudinal modes Of oscillation, thereby causing a stable output of the solid laser device of wavelength conversion type. (See T. Baer: "Large-amplitude fluctuations due to longitudinal mode coupling in diode-pumped intracavity-doubled Nd:YAG lasers", Vol. 3, No. 9, p. 1175, J. Opt. Soc. Am. B (1986).

To cope with this problem, an excitation method has been suggested for oscillating a solid laser device efficiently by exciting a semiconductor laser by condensing light at the end of a laser crystal with an eye on the high output of the semiconductor laser (hereinafter simply referred to as "the semiconductor laser" or "laser diode") (See D. L. Sipes; "Highly efficient neodyminum: yttrium aluminum garnet laser end pumped by a semiconductor laser array", Vol. 147, No. 15, Appl. Phys. Lett. (1985).

Another method that has so far been suggested is such that the spatial hole burning in a laser crystal is obviated to stabilize the output by inserting the laser crystal between two one-fourth wavelength plates in a solid laser device. (JP-A-3-49278)

Nevertheless, the stability of a semiconductor laser providing a pumping power light source as relative to the output stability of a solid laser has never been studied.

In an optical disk system having a semiconductor laser as a light source, it is known that a reflection noise is generated in the semiconductor laser when the reflection return light from another optical system or a disk surface is fed back to the semiconductor laser. This reflection noise is required to be suppressed within a tolerable range where no error occurs in the reproduction signal of an optical disk system. An example of the method for reducing the reflection noise is described in "Semiconductor Laser for Suppressing the Noise Caused by Return Light below Tolerable Value by Adding a High-Frequency Oscillation Circuit", by Naoki Kayane, Masahiro Ojima and Michiharu Nakamura, published in the Oct. 10, 1983 issue of Nikkei Electronics. The summary of this article is described in (1) to (4) below.

(1) A light isolator is interposed between a semiconductor laser and an optical system in a later stage to reduce the optical feedback to the semiconductor laser.

(2) A supersaturated absorbent like Te is arranged in an n-type clad layer of a semiconductor laser at node positions of a standing wave in oscillation mode. According to this method, the oscillation mode is not absorbed, and only a non-oscillation mode such as a reflected return light is selectively absorbed without causing any mode competition, thereby producing a stable oscillation.

(3) The reflection noise tends to increase for up to about 1% and decrease for over 1% in the ratio of the reflected return light to the semiconductor laser output, i.e., the light feedback rate, This is by reason of the fact that the stability in a high frequency region increases with the optical feedback rate, and the coherence is deteriorated thereby to stabilize the noise level as a result of an increased number of oscillation modes.

(4) A method for increasing the oscillation modes of a semiconductor laser forcibly is by subjecting a drive power supply of the semiconductor laser to high-frequency modulation. The coherence of the reflected return light is thus reduced.

In order to compare a solid laser using a semiconductor laser as a pumping power light source with a reduced reflection noise of the semiconductor laser and the one with a reflection noise not reduced with each other, the transmission output of the laser crystal was studied.

Figure 6:
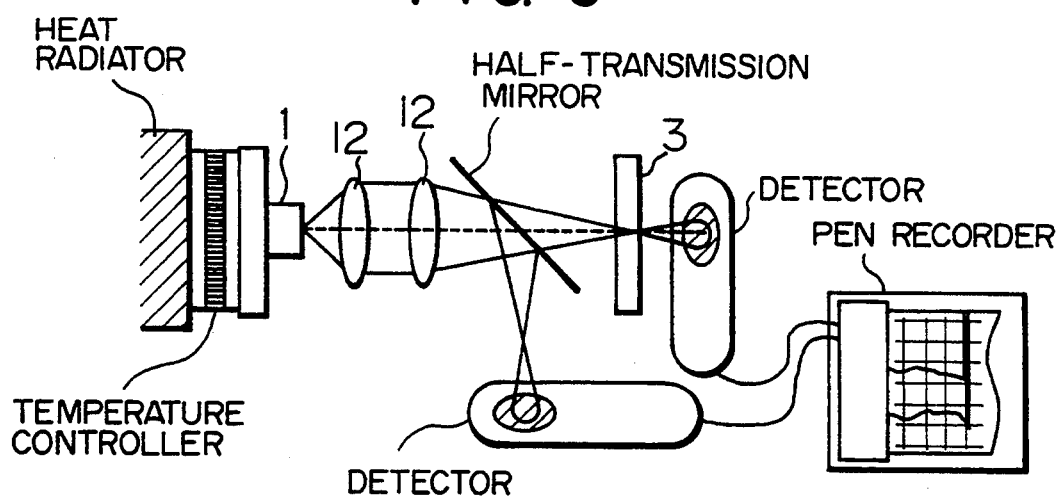
FIG. 6 is a diagram showing a configuration for measuring the transmission output of a laser crystal.

FIG. 6 is a diagram for explaining a method of measuring the transmission output of a laser crystal. The output of a semiconductor laser 1 is condensed at a laser crystal 3 by means of a condensing optical system 12. The oscillation wavelength of the semiconductor laser 1 is set to a level associated with an absorption peak of the laser crystal 3 in advance by a temperature controller. Also, the output of the semiconductor laser 1 is measured by being reflected partially before entering the laser crystal 3. At the same time, chronological change of the transmission output is measured with and without a light isolator inserted immediately after the condensing optical system 12.

Figures 7A, 7B:
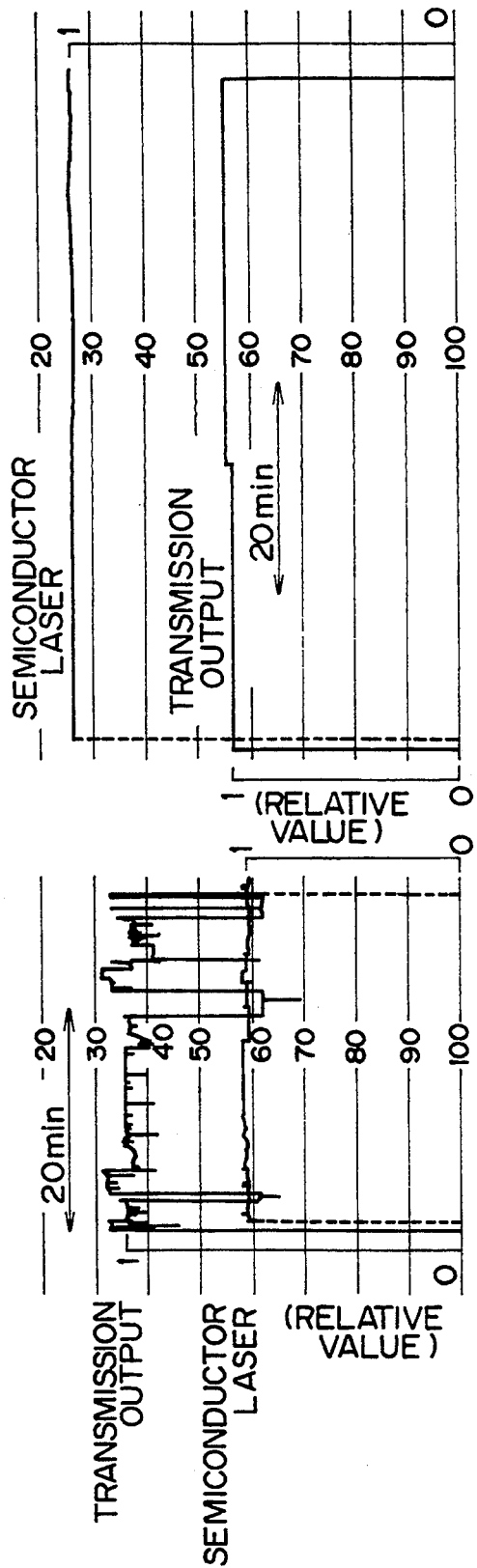
FIGS. 7a and 7b are graphs showing the transmission output of a laser crystal.

FIG. 7 shows the result of measurement of the transmission output of a laser crystal. As seen from FIG. 7A, the transmission output is unstable when no light isolator is inserted. In the case where a light isolator is interposed as shown in FIG. 7B, by contrast, a one-hour measurement produced a stable RMS value of ±1.4% as a fluctuation of the transmission output. In FIGS. 7A and 7B, the output of the semiconductor laser is stable and the transmission output.

The absorption coefficient of a laser crystal of Nd:YVO4, for example, has a full width at half maximum (FWHM) of as small as several nm at about an absorption peak, so that the absorption coefficient is reduced if the wavelength of the semiconductor laser deviates from the absorption peak wavelength of the laser crystal. It is thus seen that the instability of the transmission output shown in FIG. 7A is attributable to a change in the oscillation wavelength of the semiconductor laser. The result of the experiment described above shows that it may be possible to stabilize the output of a solid laser device by inserting a light isolator between a semiconductor laser and the end of a laser crystal. According to the present invention, insertion of a light isolator as a means for suppressing the reflection noise to less than a tolerable noise level stabilizes the output of a solid laser device.

It was also confirmed from the above-mentioned result of experiment that a reflection noise is caused by the use of a semiconductor laser as a pumping power light source of a solid laser device. This indicates that the output of a solid laser is stabilized by introducing into a solid laser device a measure for reducing the reflection noise of a semiconductor laser.

Figure 8:
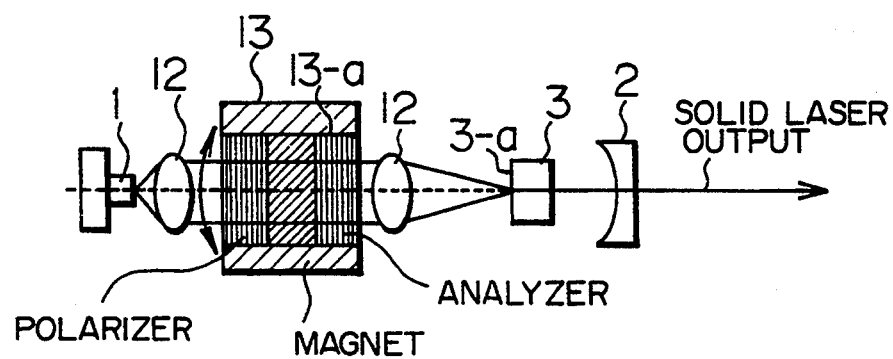
FIG. 8 is a diagram showing a configuration of a solid-state laser considering the reflection noise of a semiconductor laser.

A further embodiment of the present invention is shown in FIG. 8. This embodiment comprises a semiconductor laser 1 providing a pumping power light source, a condensing optical system 12, a light isolator 13, a laser crystal 3 and an output mirror 2. A resonator for the solid laser is formed between the mirror 2 and the mirror output at an end 3-$a$ on the incident side of the laser crystal.

The pumping power produced from the semiconductor laser 1 is condensed at the laser crystal 3 by the condensing optical system 12. The light isolator interposed between the condensing optical system 12 and the laser crystal 3 is so constructed as to include a Faraday rotor 13-$a$ and a polarizer and an analyzer in a hollow magnet. The directions of polarization of the polarizer and the analyzer are at right angles to each other, and the direction of polarization of the semiconductor laser 1 is changed 45° by the Faraday rotor 13-$a$. As a result, in the light isolator 13, the direction of polarization of the reflected return light from subsequent stages crosses at right angles to that of the polarizer by the Faraday rotor 13-$a$ when the reflected return light reaches the polarizer, thereby cutting off the return light reflected from the optical system toward the semiconductor laser 1 in subsequent stages of the light isolator 13.

The polarizer is arranged in such a position that the direction of polarization thereof coincides with that of the semiconductor laser 1, being adjusted by rotation to minimize the insertion loss. By using the light isolator 13, the noise reflected from the optical system in subsequent stages and the end 3-$a$ on the incident side of the laser crystal are controlled to less than a tolerable noise level. Also, a multiple-stage structure of the light isolator 13 further reduces the light feedback rate. If the light isolator 13 is arranged at an angle to the optical axis, on the other hand, a minute return light reflected from the light isolator 13 is prevented from reaching the semiconductor laser 1. Also, the light isolator 13 and the condensing optical system 12 may be in any relative positions. Further, the condensing optical system 12 is not required to be constructed as shown in FIG. 8, but may be constructed in any way to the extent that the absorption coefficient is not considerably reduced. A nonlinear crystal arranged in the resonator of the solid laser or in subsequent stages produces various types of solid laser device of wavelength conversion type. A similar solid laser device of wavelength conversion type is obtained also in the embodiments mentioned below.

Figure 9:
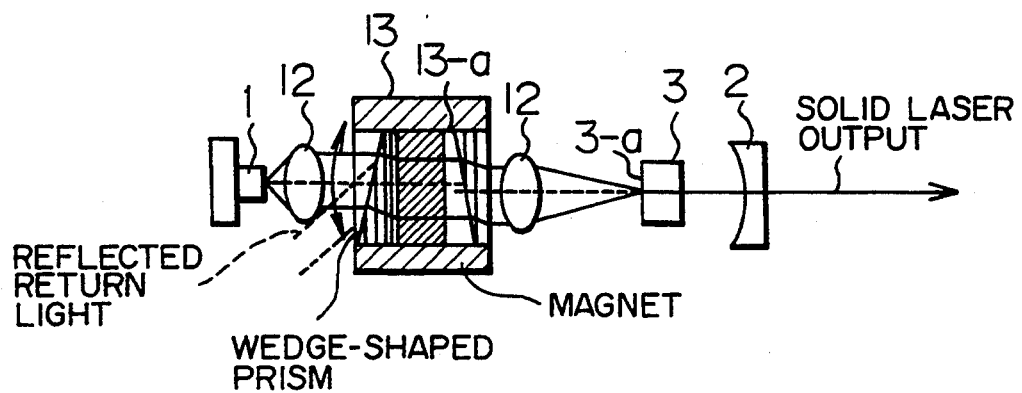
FIG. 9 is a diagram showing another configuration of a solid-state laser considering the reflection noise of a semiconductor laser.

Still another embodiment of the present invention is shown in FIG. 9. A light isolator 13 has a Faraday rotor 13-a and two wedge-shaped birefringent prisms in a hollow magnet. As shown in FIG. 9, the light entering from the semiconductor laser 1 is adjusted in such a way as to leave in parallel to the optical axis in the light isolator 13. On the other hand, the direction of polarization of the return light reflected from subsequent stages of the light isolator 13 crosses at right angles to that of the incident light by means of the Faraday rotor 13-a. The wedge-shaped prism is so constructed that the refractive index depends on the direction of polarization due to birefringence, and the reflected return light is prevented from passing through the same light track as the incident light and returning to the semiconductor laser 1.

Another embodiment of the present invention is shown in FIG. 10. A light isolator 13 includes a polarized beam splitter (hereinafter referred to simply as "PBS") 14 and a ¼ wavelength plate 15. The PBS 14 has a transmittance of at least 95% in the direction of polarization of the semiconductor laser 1 and is adjusted by being rotated around the optical axis to maximize the transmission output of the semiconductor laser 1. Also, the ¼ wavelength plate 15 converts the output of the semiconductor laser 1 into a circular polarization. The polarization of the return light reflected from the end 3-a on the incident side of the laser crystal is changed to a linear one at an angle of 90° from the direction of polarization of the semiconductor laser at the time of passing through the ¼ wavelength plate 15 once again, and fails to reach the semiconductor laser 1 as it is reflected in the direction perpendicular to the optical axis by the PBS 14. By slanting the optical surface of the PBS 146 or the ¼ wavelength plate 15 to the optical axis, a minute return light reflected from the PBS 146 or the ¼ wavelength plate 15, as the case may be, is prevented from reaching the semiconductor laser 1. Also, the PBS 14 and the ¼ wavelength plate 15 are desirably disposed between the semiconductor laser 1 and the laser crystal 3 and at any desired position relative to the condensing optical system 12. Further, the intensity ratio of the perpendicular components of the circular polarization is desirably 1 to 1, but may be in any range to the extent that no reflection noise is generated.

In addition, when the laser crystal 3 is birefringent, the direction of polarization of the reflected return light changes between before and after reflection. In view of this, the difference in refractive index depending on the direction of crystal axis of the wavelength plate 15 is adjusted in such a way that the direction of polarization of the reflected return light is at right angles to that of the semiconductor laser 1 between the wavelength plate 15 and the PBS 14.

Figure 11:
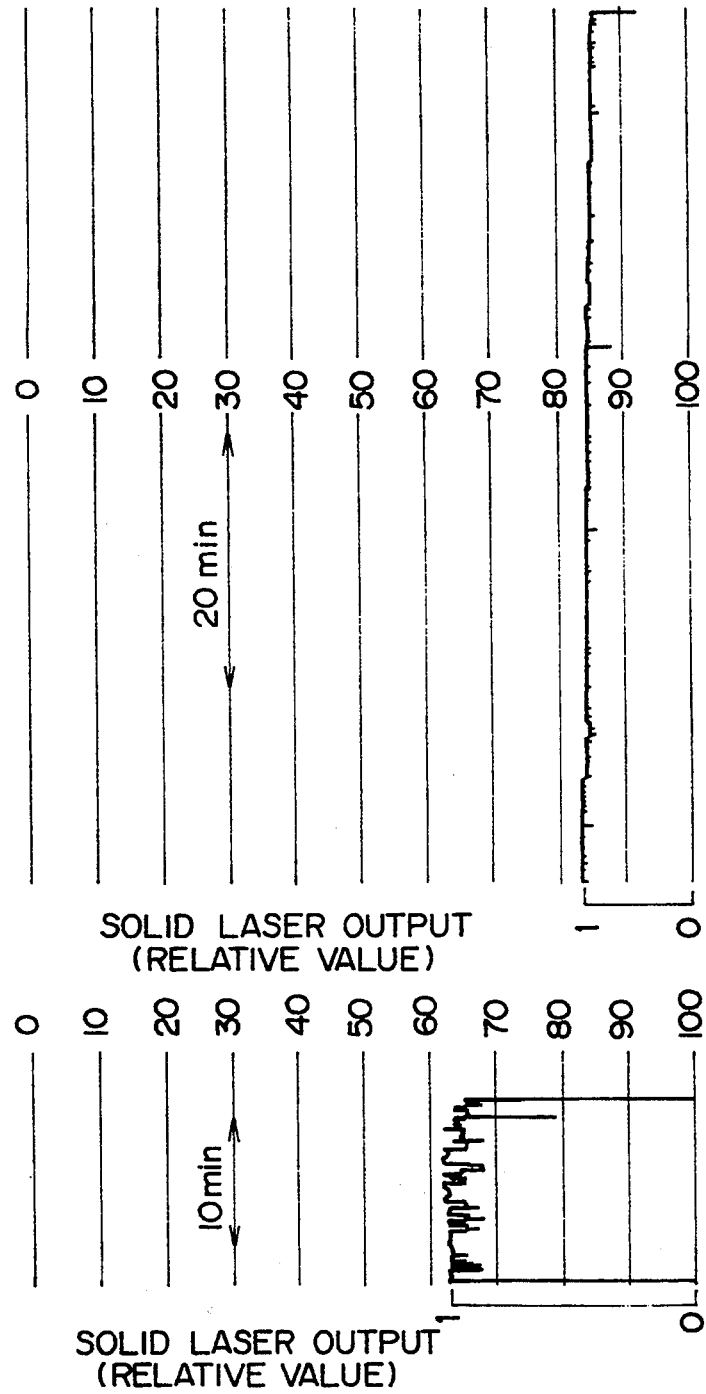
FIGS. 11a and 11b are graphs showing the transmission output of a laser crystal of a solid-state laser considering the reflection noise of a semiconductor laser.

FIG. 11 is a diagram for explaining the effect of the present invention. FIG. 11A shows the chronological change of the output of a solid laser before insertion of a light isolator. By insertion of a light isolator, a stable output as shown in FIG. 11B is produced.

A further embodiment of the present invention is shown in FIG. 12. According to this embodiment, a semiconductor laser 1 is made up of an n-type clad layer with Te added thereto. FIG. 12A shows a schematic diagram of the semiconductor laser 1. The element Te added to the n-type clad layer is arranged periodically at nodes of a standing wave in oscillation mode. (In the case where the laser crystal 3 is of Nd:YVO4, for instance, the wavelength of the semiconductor laser 1 is about 810 nm, and therefore the distance between adjacent Te is about 405 nm.) A solid laser device as shown in FIG. 12 is produced with the semiconductor laser 1 shown in FIG. 12A as a pumping power light source. In this case, the reflection noise is further reduced positively if the above-mentioned light isolator 13 is interposed between the semiconductor laser 1 and the laser crystal 3.

FIG. 13 is a diagram for explaining a still further embodiment of the present invention. According to this embodiment, the drive power supply of the semiconductor laser 1 has added thereto a high-frequency modulation circuit. The modulation frequency is variable from 500 MHz to 1 GHz. The oscillation wavelength of the semiconductor laser 1 is multiple in mode and the coherence with the reflected return light is so inferior that the reflection noise level can be controlled to less than a tolerable value. By using the semiconductor laser as a pumping power light source, a solid laser device with a stable output is produced. Also, the reflection noise is reduced without fail by inserting the light isolator 1 between the semiconductor laser 1 and the laser crystal 3.

Figure 14:
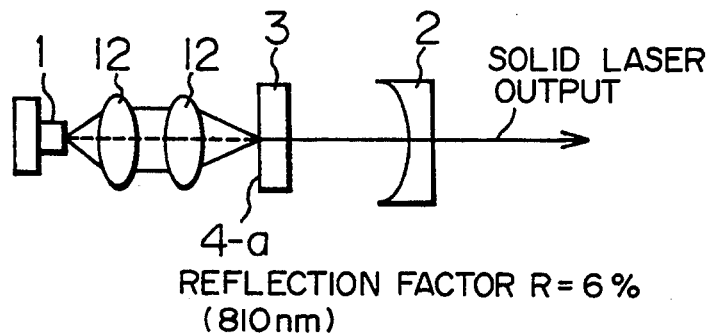
FIG. 14 is a diagram showing another configuration of a solid-state laser considering the reflection noise of a semiconductor laser.

FIG. 14 is a diagram for explaining another embodiment of the present invention. The reflection factor at the oscillation wavelength of the semiconductor laser 1 at the end 4-a on the incident side of the laser crystal is set to 6%. Since the reflection factor of the mirror on the outgoing side of the semiconductor laser 1 is about 30%, the light feedback rate from the end 3-a on the incident side of the laser crystal to the semiconductor laser 1 is a maximum of about 2%. The reflection noise of the semiconductor laser 1 at the light feedback rate of about 2% is less than a tolerable noise level. The stable output of the semiconductor laser 1 has made it possible to stabilize the output of a solid laser device.

Figure 15:
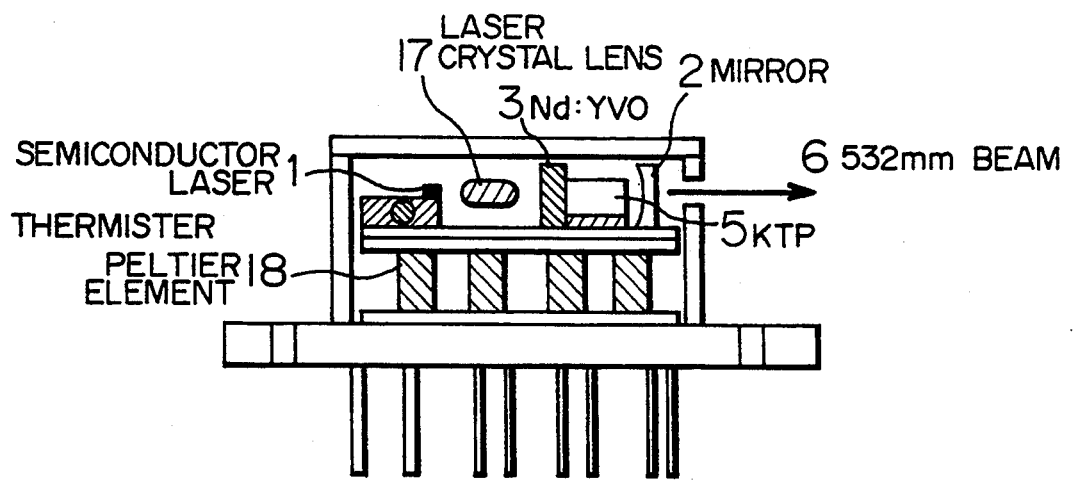
FIG. 15 is a diagram showing a sectional configuration of a solid-state laser.

FIG. 15 shows still another embodiment of the present invention. Specifically, a nonlinear crystal (such as KTiOPO4-KTP) 5 controlled in retardation has a laser crystal excited by a beam from the semiconductor laser 1 condensed by a laser crystal lens 16 thereby to configure a resonator with a output mirror 2. The nonlinear crystal 5 placed in the resonator produces a secondary high harmonic wave (532 nm). The temperature of the semiconductor laser 1 is detected by a thermistor 17, controlled by a Peltier cooler 18, and tuned to the absorption wavelength of the laser crystal. The resonator, which is controlled in temperature by the Peltier cooler, is mechanically stabilized.

The nonlinear crystal 5 is also controlled in temperature by a Peltier cooler, and retardation is thus maintained at a predetermined level. Further, the laser crystal can be cooled. Only high harmonic waves can be recovered by coating on the outgoing side of the output mirror 2 for cutting the fundamental wave.

Furthermore, if the inner surface of the resonator of the laser crystal 3 is recessed and used as a lens, the beam size of the fundamental wave is reduced in the nonlinear crystal for an improved wavelength conversion efficiency.

Figure 16:
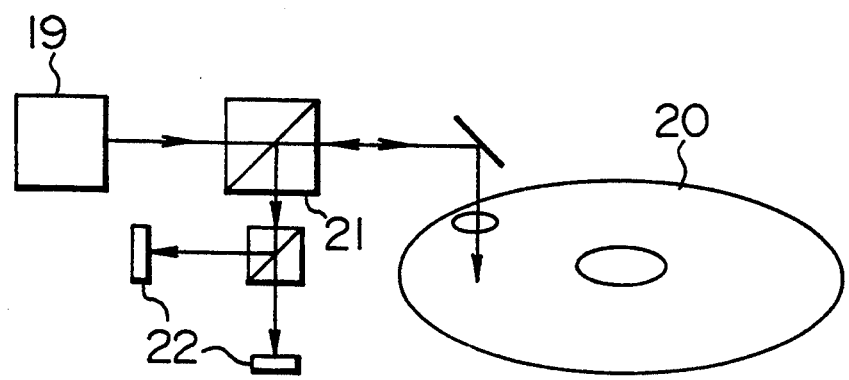
FIG. 16 is a schematic diagram showing an optical information processing system using a solid-state laser as a light source.

Still another embodiment of the present invention is shown in FIG. 16. The beam from a laser light source 19 according to the present invention reaches an electro-optical disk 20 through a beam splitter. The return light 21 with the direction of polarization thereof rotated by the Kerr effect arrives at a detector 22 while being modulated depending on the presence or absence of a domain on the disk thereby to reproduce a signal on the disk. In the process, the beam from a light source according to the present invention is linearly polarized, and all the light contributes to the Kerr effect. The utility of light is therefore improved as compared with the elliptic polarization. This constitutes another advantage in practical application of the present invention.

Now, an embodiment of the optical information processing system with a solid laser as a light source will be explained.

Figure 17:
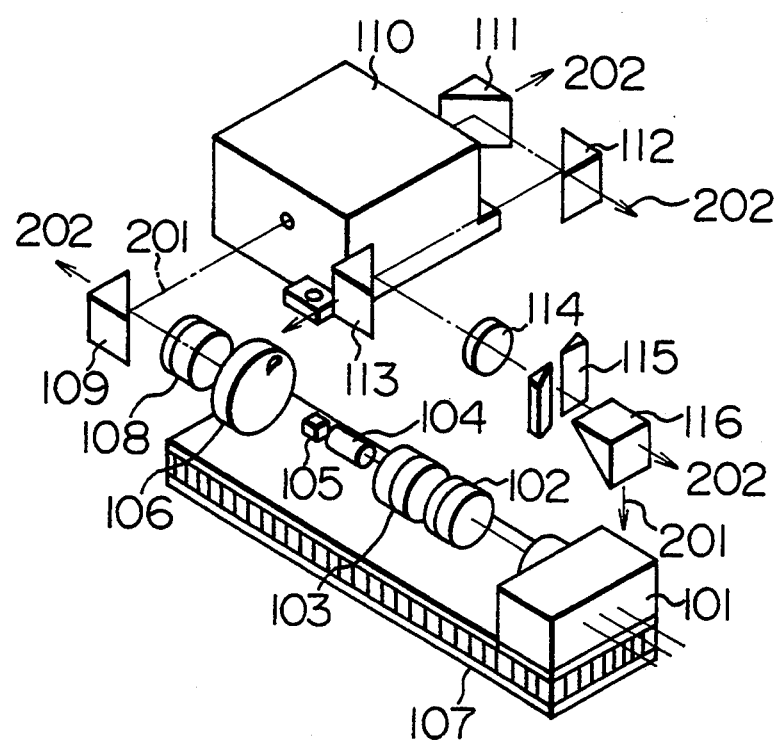
FIG. 17 is a diagram showing a configuration of a light source of an optical information processing system.

FIG. 17 is a perspective view of a light source of an optical information processing system. A light source 101 such as a semiconductor laser, objective lenses 102, 103, a YAG rod 104, a KTP crystal 105 and a concave mirror 106 are mounted on a heat control element 107 such as a Peltier cooler. Further, the optical axis is bent by a mirror 109 through an objective lens 108, and the resultant light enters an acousto-optical element 110. The light that has passed through the acousto-optical element 110 is bent by mirrors 111, 112, 113, and through a ½-wavelength plate, is led from a slit 115 just downward through a mirror 116.

The light that left the light source 101 is converted into a parallel light by the objective lens 102, and enters the objective lens 103. The light converged by the objective lens 103 enters a portion near the end of the YAG rod 104, and a wavelength of 1064 nm is produced through a resonator made up of the concave mirror 106. By inserting the KTP crystal 105 in the light path, a second high harmonic wave of 532 nm is obtained and produced from the concave mirror 106. This second high harmonic wave is condensed by use of the objective lens 108 and bent by the mirror 109 to form a focus on the acousto-optical element 110. While the second high harmonic wave is produced, a wavelength of 1064 nm, etc. is produced as well as an intended wavelength. The mirror 109 having the ability to select wavelengths is used to return the light of other than the intended wavelength thereby to reflect only the neighbourhood of an intended wavelength. In this way, only the light in the neighbourhood of an intended wavelength is passed along an optical axis 201 and led toward the acousto-optical element 110. And the remaining light proceeds along a path 202 curved by the mirror 109, thereby permitting separation of wavelengths. The use of several units of such mirror makes it possible to sequentially cut light of other than an intended wavelength which are reflected therewith due to an inferior workmanship.

The acousto-optical element 110 modulates light by application and cutting of a high frequency using light subjected to Bragg diffraction. The optical axis of the light that has left the acousto-optical element 110 is also adjusted by a combination of the mirrors 111 and 112 having the ability to select wavelengths, and the light path is bent by the mirror 113. The resultant light is passed through the wavelength plate 114 for aligning the plane of polarization, and the slit 115 cuts only the zero-power light which is not modulated by the acousto-optical element 110. The primary light that has passed, in contrast, is bent at right angle by a mirror 116 and led to the optical system for signal detection. The section from the light source 101 to the concave mirror 106 is maintained at a predetermined temperature by the heat control element 107 such as a Peltier cooler and hermetically enclosed to prevent air fluctuations. The output of the second high harmonic wave is thus stabilized.

Figure 18:
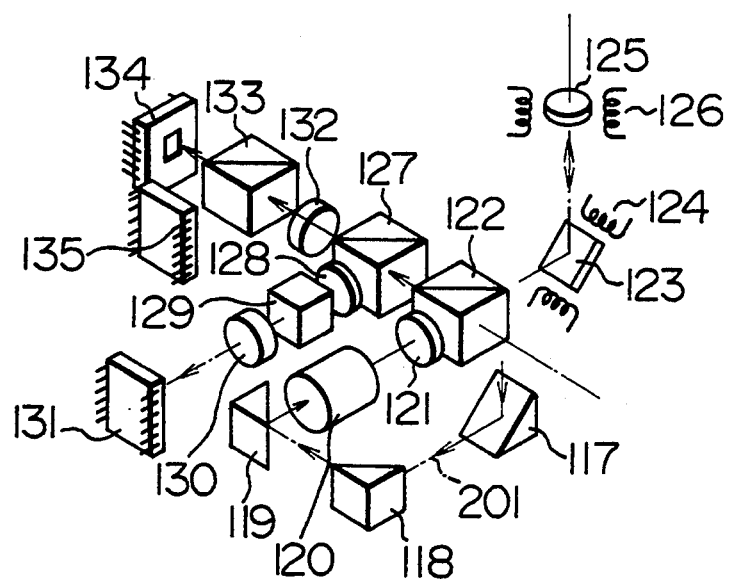
FIG. 18 is a diagram showing an optical system of an optical information processing system.

An example of an optical system for signal detection is shown in FIG. 18. Mirrors 117, 118 and 119 alter the optical axis. The light passes through a beam expander 120, and three spots are formed by a diffraction grating 121. The resulting light is raised at a galvano-mirror 123 from a polarized beam splitter 122 and condensed into a recording medium at an objective lens 125. The signal from the recording medium is divided into two portions by a polarized beam splitter 127, one of which is detected by a detector 131 through a ½-wavelength plate 128, a Wollaston prism 129 and a convex lens 130. The other portion of the signal proceeds straight from the polarized beam splitter 127, and is led to detectors 134, 135 for setting the auto focus and tracking, through a convex lens 128 and a half prism 133.

The light bent at right angle in FIG. 17 is further bent by the mirrors 117, 118, 119, enlarged in size by the beam expander 120, and adjusted into a parallel light. The light is then passed through the diffraction grating 121 and the polarized beam splitter 122 adjusted in transmission and reflection, and the direction of the track of the information recording medium is controlled by the galvano-mirror 123 driven by a coil 124, followed by the focusing control at the objective lens 125 driven by a coil 126, with a light spot formed at a target position. The light reflected at the target position is reflected further on the beam splitter 122, and through the beam splitters 127, 133, the wavelength plate 128, the Wollaston prism 129 and the lens 130, reaches the detector 131 for signal detection. On the other route, the light is converged at the lens 132, led to the detectors 134, 135 for setting a focus and track, and fed back for light spot control.

According to the present invention, a reflection mirror is equipped with the function of a wavelength cutting filter. Therefore, the number of parts is reduced, thereby realizing a small-sized optical head effectively making use of the space. Also, the system according to the invention may be constructed with a light source and a signal detection system isolated from each other, so that independent assemblage and adjustment are made possible to reduce time consumption.

Figure 19:
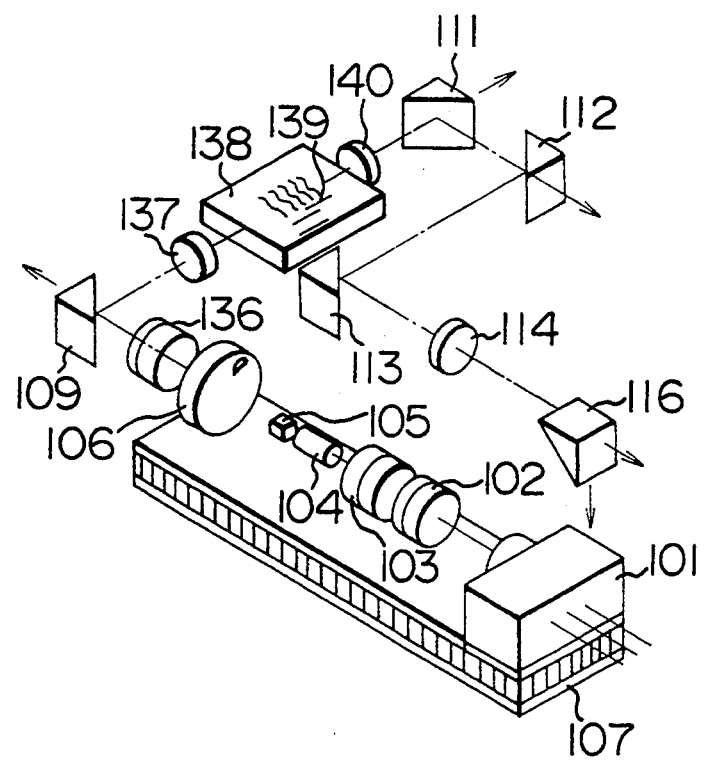
FIG. 19 shows a configuration of a light source of an optical information processing system.

A further embodiment will be explained with reference to FIG. 19. The basic configuration for generating a second high harmonic wave of a light source is similar to that included in the above-mentioned embodiments and therefore will not be described again. The second high harmonic wave that has left a concave mirror 106 is increased in beam size into parallel form at the beam expander 136, bent at a mirror 109, and applied to a thin film waveguide substrate 1 at a condensing objective lens 137. The incoming light has a surface acoustic wave generated by an interdigital transducer prepared in the thin film waveguide substrate 138 to effect diffraction. By changing the frequency applied to the interdigital transducer, the angle of the diffracted light can be changed, thus providing dual functions of modulation and deflection at the same time. The light that has left the thin film waveguide is restored to parallel light by a beam-shaping lens 140, proceeds to the mirror 106, and is led to a signal detection system.

According to the present embodiment, the thin film waveguide substrate 138 is equipped with dual functions of modulation and deflection of light. An actuator for track position control is thus eliminated from the signal detection system. This, together with the thinness of the waveguide substrate 138, reduces the thickness of the system.

According to the present invention, the retardation of the nonlinear crystal disposed with the intention of generating a high harmonic wave in a resonator of a solid laser providing a fundamental wave is capable of being controlled, thereby making it possible to maintain a predetermined polarized condition of the fundamental wave. As a result, the fact that only a single polarization mode exists in the resonator prevents competition between polarization modes, thereby leading to a stable high harmonic wave output. Also, since the linear polarization of a solid laser can be maintained, the reduction in the wavelength conversion efficiency is prevented in an application to the generation of a difference frequency and a sum frequency by a KTP crystal. In this way, a laser device according to the present invention is capable of oscillating a short-wavelength light from green, blue and purple to ultraviolet with high efficiency and stability by a laser crystal or a nonlinear crystal. As a consequence, the system according to the invention is usable as a small light source for an optical disk or a laser printer, and at the same time contributes to an increased density and an improved printing quality of such apparatuses.

The present invention provides a solid laser device with a stabilized output and a high reliability. Also, a reliable optical recording apparatus with the above-mentioned solid laser device as a light source is obtained. Further, in an optical information processing system, effective use of space is made possible by bending the path of the light emitting from a light source by a multiplicity of times. At the same time, the optical head is reduced in size by sharing a component part for plural functions.

We claim:

1. A solid laser device comprising:
   a laser resonator including a uniaxial laser crystal and an output mirror;
   a pumping power light source for applying light to the uniaxial laser crystal, thereby causing the uniaxial laser crystal to emit linearly polarized light; and
   a nonlinear optical element disposed in the laser resonator for receiving the linearly polarized light from the uniaxial laser crystal and emitting linearly polarized light.

2. A solid laser device according to claim 1, wherein said nonlinear optical element has a length such that the nonlinear optical element acts as one of a half-wavelength plate and a full-wavelength plate with respect to the linearly polarized light emitted by the uniaxial laser crystal.

3. A solid-state laser device according to claim 2, wherein the output light of said nonlinear optical element is a second high harmonic wave of light generated by said uniaxial laser crystal.

4. A solid-state laser device according to claim 2, wherein the output light of said nonlinear optical element is a sum frequency of light generated by said uniaxial laser crystal.

5. A solid-state laser device according to claim 1, wherein said nonlinear optical element includes means for controlling the temperature thereof in such a manner that the nonlinear optical element acts as one of a half-wavelength plate and a full-wavelength plate with respect to the linearly polarized light emitted by the uniaxial laser crystal.

6. A solid-state laser device according to claim 1, wherein said nonlinear optical element includes means for applying a voltage thereto in such a manner that the nonlinear optical element acts as one of a half-wavelength plate and a full-wavelength plate with respect to the linearly polarized light emitted by the uniaxial laser crystal.

7. A solid-state laser device according to claim 1, wherein said nonlinear optical element has a slant at one of the incident end and the outgoing end thereof and is moved in a direction perpendicular to an optical axis of light incident thereto.

8. A solid-state laser device according to claim 1, wherein said pumping power light source is a semiconductor laser, said solid laser device further comprising means interposed between said resonator and said semiconductor laser for reducing the reflection noise caused by the reflected return light to said semiconductor laser.

9. A solid-state laser device according to claim 8, further comprising a light isolator interposed between the uniaxial laser crystal and the semiconductor laser as a means for reducing the reflection noise.

10. A solid-state laser device according to claim 9, wherein said light isolator includes a Faraday rotator.

11. A solid-state laser device according to claim 9, wherein said light isolator includes a polarized beam splitter and a wavelength plate.

12. A solid-state laser device according to claim 11, wherein said wavelength plate is associated with one fourth of the wavelength of said semiconductor laser.

13. A solid-state laser device according to claim 11, further comprising means for adjusting a difference in refractive index of the wavelength plate depending on the direction of the crystal axis of the wavelength plate in such a manner that the direction of polarization of the reflected return light to the semiconductor laser is perpendicular to that of the semiconductor laser between said wavelength plate and said polarized beam splitter.

14. A solid-state laser device according to claim 8, wherein the drive power supply of said semiconductor laser is modulated with a predetermined frequency.

15. A solid-state laser device according to claim 14, wherein the relation $0.5 \leq f \leq 10$ holds, where f is the modulation frequency in GHz of said drive power supply.

16. A solid-state laser device according to claim 8, wherein a material M for absorbing the light in the neighbourhood of the oscillation wavelength of said semiconductor laser is added to said semiconductor laser.

17. A solid-state laser device according to claim 16, wherein said material M is tellurium (Te).

18. A solid-state laser device according to claim 8, wherein the relation $1 \leq a \leq 6$ holds, where a is the ratio in percentage of the amount of the reflected return light to said semiconductor laser to the output of said semiconductor laser.

19. A solid-state laser device according to claim 8, wherein the relation $3 \leq R \leq 20$ holds, where R is the reflection factor in percentage of the semiconductor laser wavelength at the incident end of the uniaxial laser crystal on the semiconductor laser side.

20. A solid-state laser device according to claim 8, wherein said semiconductor laser has a single oscillation wavelength.

21. A solid-state laser device according to claim 8, wherein said reflection noise is a wavelength displacement of a semiconductor laser.

22. A solid-state laser device according to claim 1, wherein said uniaxial laser crystal is yttrium vanadate YVO$_4$ with neodymium (Nd) added thereto.

23. An optical information processing system comprising said solid laser device according to claim 1 and information processing means for processing information by utilizing light leaving said solid laser device.

24. An optical information processing system according to claim 23, wherein the information processing means includes at least one mirror for bending a light path disposed in an outgoing light path of said solid-state laser device.

25. An optical information processing system according to claim 24, wherein said bending mirror has the ability to select wavelengths and is capable of isolating a predetermined wavelength.

26. An optical information processing system according to claim 23, wherein the information processing means includes an acousto-optic modulator for modulating the light leaving said solid laser device.

27. A solid-state laser device according to claim 1, further comprising means for controlling the uniaxial laser crystal, the nonlinear optical element, the pumping power light source, and the output mirror to have a predetermined temperature with a single temperature controller.

28. A laser device comprising:
a laser resonator including a laser medium, the laser medium generating a linearly polarized laser beam as a fundamental wave when excited;
a nonlinear crystal disposed in said resonator for receiving the linearly polarized laser beam from the laser medium, generating a high harmonic wave of said fundamental wave, and emitting linearly polarized light; and
means for controlling a retardation characteristic of said nonlinear crystal to be an integral multiple of a half wavelength of said fundamental wave.

29. A laser device according to claim 28, wherein said high harmonic wave of the fundamental wave is a second high harmonic wave.

30. A laser device according to claim 28, wherein said high harmonic wave of the fundamental wave is a sum frequency.

31. A laser device according to claim 28, wherein said means for controlling the retardation characteristic of the nonlinear crystal is a temperature controller for controlling a temperature of the nonlinear crystal.

32. A laser device according to claim 28, wherein said means for controlling the retardation characteristic of the nonlinear crystal is a voltage application device for applying a voltage to the nonlinear crystal.

33. A laser device according to claim 28, wherein said means for controlling the retardation characteristic of the nonlinear crystal includes means for slanting the incident and/or outgoing side of the nonlinear crystal and moving the nonlinear crystal in a direction perpendicular to a propagation direction of the fundamental wave to thereby change the retardation characteristic.

34. A laser device according to claim 28, wherein said means for controlling the retardation characteristic of the nonlinear crystal includes means for dividing the nonlinear crystal into portions having mutually different thicknesses, the portions being joined to each other with mutually different crystal orientations, thereby changing the retardation characteristic.

35. A laser device according to claim 28, wherein said laser medium is uniaxial.

36. A laser device according to claims 28, wherein the laser resonator further includes an output mirror and an outgoing side of the output mirror for recovering the high harmonic wave is covered with a coating for filtering out the fundamental wave.

37. A laser device according to claim 28, wherein a surface of said laser medium facing said nonlinear crystal has a concave shape.

38. A laser device according to claim 28, further comprising means for directing the linearly polarized light emitted from the nonlinear crystal to one of a reloadable magneto-optic disk, a phase-variable disk, and a reproduction-only disk.

39. A method of generating a high order harmonic wave laser beam comprising the steps of:
applying a fundamental wave laser beam to a nonlinear optical crystal disposed in a laser resonator, thereby causing the nonlinear optical crystal to emit a high order harmonic wave laser beam; and
controlling one of a shape of the nonlinear optical crystal, a temperature of the nonlinear optical crystal, and a voltage applied to the nonlinear optical crystal such that the nonlinear optical crystal acts as one of a half-wavelength plate and a full-wavelength plate with respect to the fundamental wave laser beam.

40. A method according to claim 39, wherein the fundamental wave laser beam is linearly polarized and the high order harmonic wave laser beam emitted from the nonlinear optical crystal is linearly polarized.

* * * * *